Nov. 15, 1960     G. N. KELLEY     2,960,183
PREPARATIVE COLUMN FOR GAS CHROMATOGRAPHY
Filed June 2, 1958     3 Sheets-Sheet 1
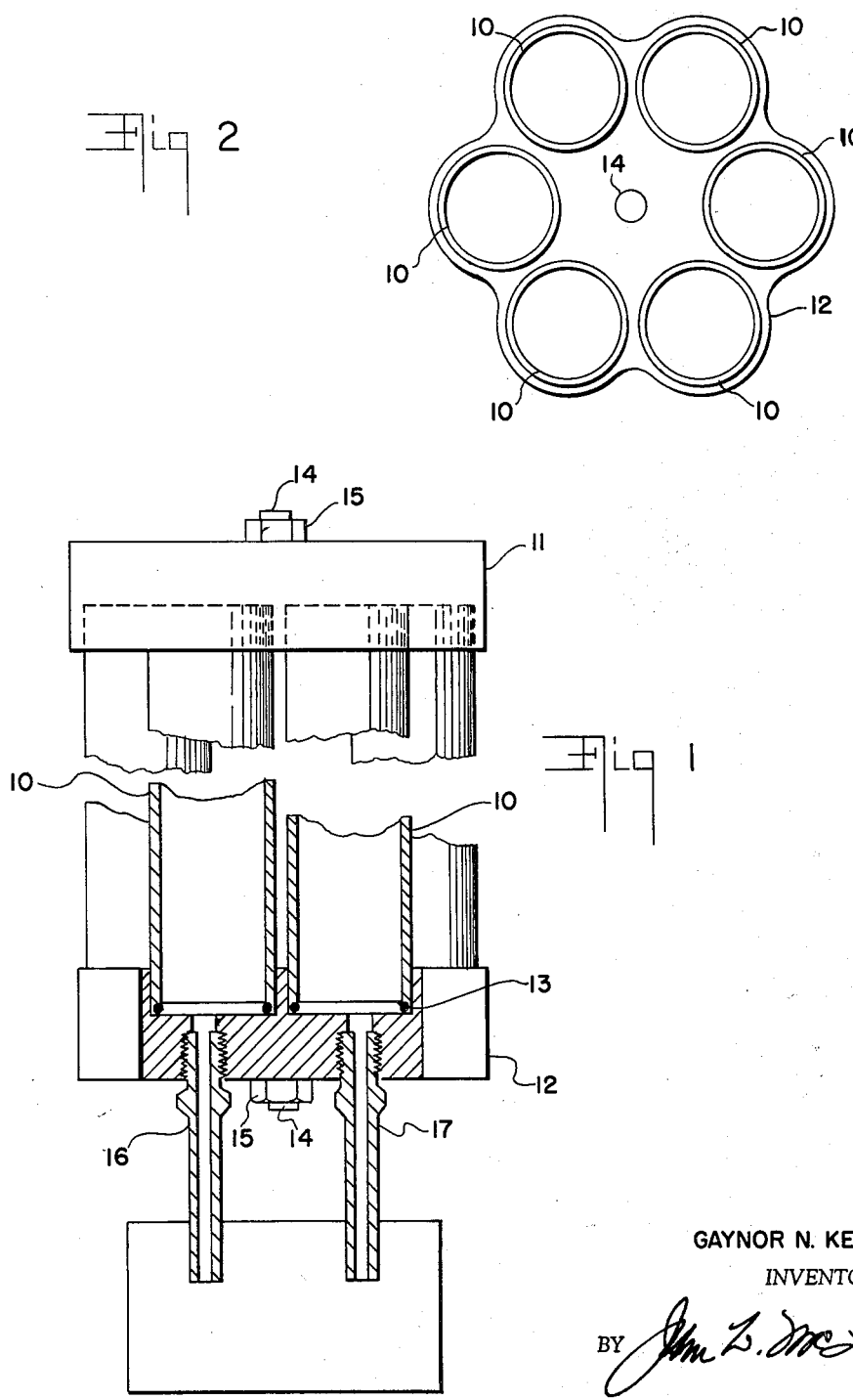
GAYNOR N. KELLEY
*INVENTOR.*
BY
ATTORNEY Nov. 15, 1960  G. N. KELLEY  2,960,183
PREPARATIVE COLUMN FOR GAS CHROMATOGRAPHY
Filed June 2, 1958  3 Sheets-Sheet 2

GAYNOR N. KELLEY
*INVENTOR.*

BY

ATTORNEY

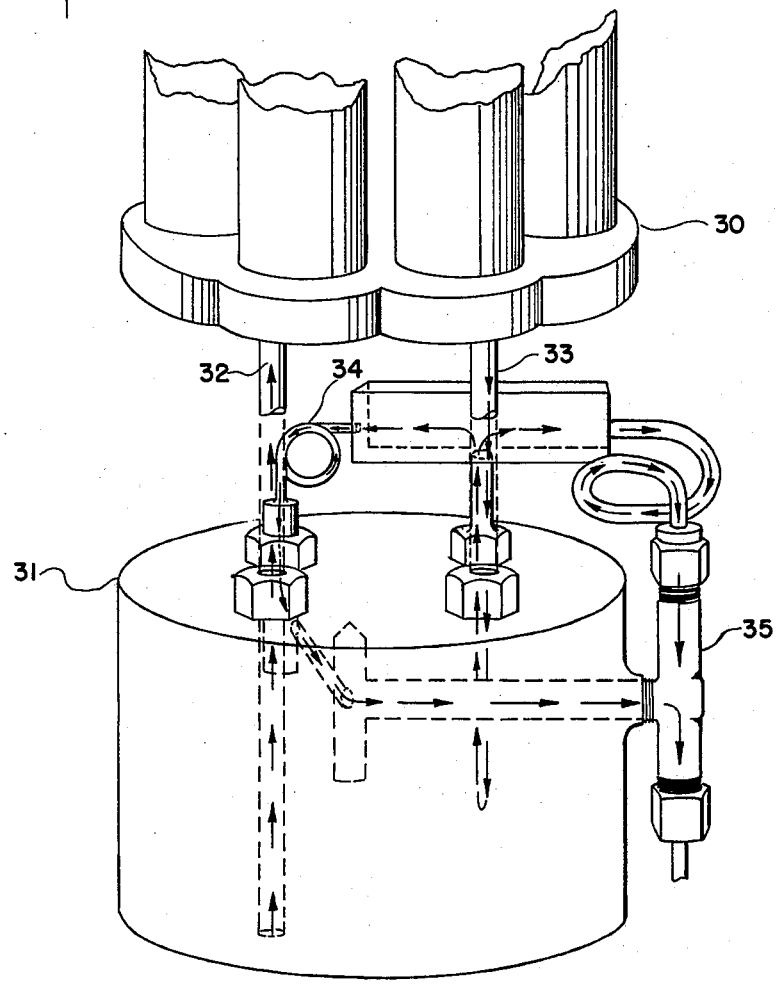

United States Patent Office 2,960,183
Patented Nov. 15, 1960

2,960,183
PREPARATIVE COLUMN FOR GAS CHROMATOGRAPHY

Gaynor N. Kelley, Ridgefield, Conn., assignor to The Perkin-Elmer Corporation, Norwalk, Conn., a corporation of New York Filed June 2, 1958, Ser. No. 739,198

3 Claims. (Cl. 183—2)

This invention is directed to a preparative column for a vapor fractometer. The rapid and accurate separation of the components of a mixture may be readily carried out by vapor fractometer means which has become widely commercially available within the last several years. The separation of the constituents of a sample by vapor fractometry (also known as vapor phase chromatography or gas chromatography) is especially well suited in working with hydrocarbons.

The device of the present invention may be connected to a vapor fractometer analysis instrument to rapidly and accurately separate the constituents of a sample without relying upon the more conventional and sometimes tedious methods of wet chemistry, distillation and the like. The preparative column of the present invention enables the collection of any one or more of the several constituents in a sample mixture, each collective constituent comprising an uncontaminated and highly purified component of the original mixture.

In accordance with the concept and teaching of the present invention, the device is adapted to be selectively disposed so as to vary the effective column length affording the most expeditious and desirable separation of sample mixtures in accordance with their particular physical characteristics as related to vapor fractometry techniques.

The object of the present invention is therefore to accurately and rapidly separate the constituents of a mixture to produce collective samples suitable for laboratory or other use.

The construction, operation and features of the present invention will be better appreciated from an understanding of its operation as described in the more detailed disclosure which follows when taken with the accompanying illustrative drawings in which, Fig. 1 shows a partial cross-sectional view of a typical embodiment of the present invention using six tubular lengths of column;

Fig. 2 is a cross-sectional view of the embodiment of Fig. 1;

Fig. 5 is an illustration of typical flow of the effluent stream to and from the inlet and outlet connections employed in the present invention when it is used in conjunction with a thermal conductivity type of detection cell.

Figure 3:
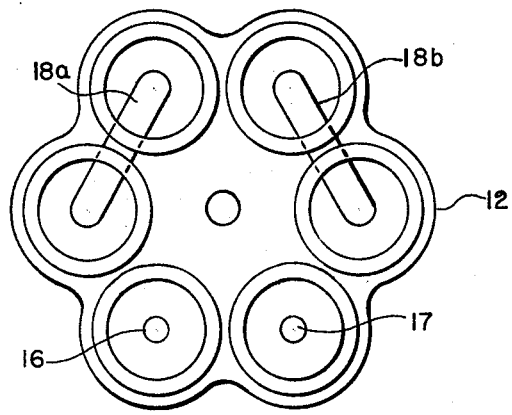
Fig. 3 is a top view of the lower end cap used in a preferred embodiment of the present invention.

As illustrated in Fig. 1, the preferred embodiment of the present invention comprises an assembly which includes a plurality of hollow tubes 10 of equal length. These tubes are of relatively large diameter as compared to the more conventional vapor fractometer columns and may be of the order of 1" O.D. or more as compared to the ¼" or smaller tubing customarily used for vapor fractometer columns. The hollow tubes 10 are usually packed with an inert material, such as celite, which supports a liquid substrate developer frequently in the form of a film of suitable oily substance, such as 30 percent didecyl phthalate.

In accordance with well-known vapor fractometry principles, the developer has suitable affinities for the constituents of the mixture to be analyzed. As a result, the constituents of the sample are retained in the column for varying lengths of time dependent upon their affinity for the substrate developer and emerge from the column separated from one another by known or determinable time intervals. The general principles of vapor fractometry techniques and phenomena will be found in a publication by H. H. Hausdorff entitled "Vapor Fractometry (Gas Chromatography) a Powerful New Tool in Chemical Analysis."

The large inside diameter hollow tubes 10 are held in place by an upper end cap 11 and a lower end cap 12. Appropriate means, such as the O-ring shown in 13, is employed to form a seal between each column end where it is seated in the end caps 11 and 12. Means such as the rod 14 threaded on the ends to accommodate nuts 15 is used to draw the assembly together and maintain the end caps 11 and 12 in sealed contact with the hollow tubes 10. An inlet connection 16 connects to one of the hollow tubes of the column and an outlet connection 17 connects to an adjacent tube of the column assembly. These connections are adapted to admit the carrier gas employed in vapor fractometry techniques and, as is well known in the art, the sample mixture is injected into the carrier gas stream to be carried through the column.

Fig. 2 is a cross-sectional view of the embodiment of Fig. 1 and illustrates a six-tube embodiment of the present invention. In this particular embodiment, the plurality of tubes 10 are disposed in equally spaced relation to the central axis of the assembly which is coincident with the center of the rod 14. Like parts of the cross-sectional drawing of Fig. 2 have the same numerical designation as they bear on Fig. 1.

Fig. 3 illustrates the lower end cap of the embodiment of Fig. 1. The end cap 12 is recessed to receive six equal lengths of hollow tubing and the inlet connection 16 is made to one tube as shown while the outlet connection from the assembly 17 is made to an adjacent tube of the assembly. Connecting conduits are made between the remaining pairs of tubes in accordance with the teaching of the present invention.

Figure 4:
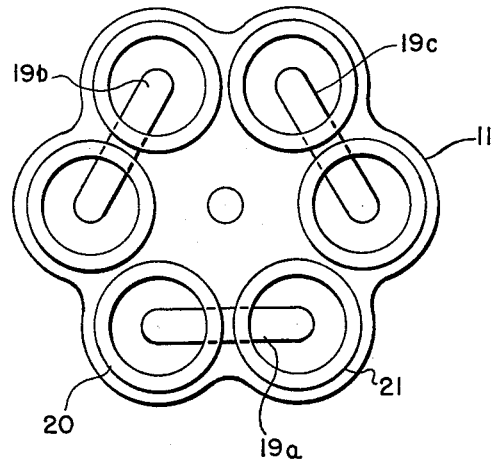
Fig. 4 is a top view of the upper end cap employed in the embodiment of Figs. 1 and 2.

Fig. 4 illustrates the upper end cap employed in the assembly of the embodiment of Fig. 1 and it is seen to be similar in shape and configuration to the lower end cap 12. The upper end cap does not, however, have inlet and outlet connections, but rather has recessed conduits 19 which connect adjacent pairs of tubes. The end caps 11 and 12 as illustrated in Figs. 3 and 4 are adapted and designed to be selectively disposed in relation to the plurality of hollow tubes of the column of the present invention so as to selectively vary the column length of the device as desired.

Assuming for illustrative purposes that the end caps are connected and secured in place with respect to the columns with the upper end cap 11 of Fig. 4 in the same disposition relative to the lower end of cap 12 of Fig. 3 as shown in those two drawings, it will be seen that the carrier gas will enter the device through inlet connection 16, proceed up through the hollow tube 20, across the inter-tube connection 19a through the upper end cap 11, and down through the tube 21 to be discharged through the outlet connection 17, the remaining lengths of tubing being bypassed. If the upper end cap 11 as shown in Fig. 4 is relocated sixty degrees in either direction, however, and secured to the plurality of tube lengths comprising the column, it will be seen that the carrier gas and the sample entering through the inlet connection 16 will proceed to pass through each of the six tubes in turn by means of the interconnecting conduits 18a and 18b in the lower end cap, and 19a, 19b and 19c in the upper end cap emerging at the outlet connection 17. Thus, the assembly of the present invention may be arranged to effectively increase the column length by a multiple dependent upon a number of column lengths used in the assembly. This is of particular advantage in separating constituents of samples which require greater column length. More particularly, it will be obvious to those skilled in the art that the greatly increased cross-section of a preparative column allows a much higher flow rate. Therefore, to effect reliable separation, it is not infrequently necessary to greatly increase the column length.

Fig. 5 illustrates an embodiment of the present invention in which the multicolumn assembly indicated generally at 30 is shown connected to a detector block 31 which may be of the thermal conductivity type. The carrier gas flow which carries the sample to be separated into the column is shown entering the preparative column at the inlet connection 32. The carrier gas is customarily carried through the detector block and produces a signal by reason of diffusion of some of the carrier gas into the thermal conductivity cell which may be equipped with a thermistor, for instance. The electrical output developed across such a thermistor provides a reference signal. The carrier gas and sample emerge from the preparative column from the outlet connection 33 after passing through two or six lengths of tubing in accordance with the disposition of the end caps and the recessed conduits therein as explained hereinbefore.

It has been previously pointed out that the flow rate in the preparative column is much greater than that in the ordinary column and, in order to adapt the detector cell block of commercially available vapor fractometers for use with the preparative column, a capillary bypass 34 with a side-T 35 is provided. The carrier gas and separated sample emerging through the outlet connection 33 flows to the bypass and divides into two streams going in two different directions. A relatively small amount of the flow passes through the restriction 34 which may take the form of a capillary tube from whence it passes through a thermal conductivity cell and is exhausted to the side-T 35. The greater portion of the emergent flow passes directly to the side-T 35 where it is connected to appropriate collection means.

The reasons for not saturating a thermal conductivity cell with too great a flow of gas stream will be evident to those skilled in the art. The desirability of providing that the preparative column of the present invention is readily adapted to commercial vapor fractometer analysis instruments is believed to be self-evident in that it has the advantage of extending the use of existent vapor fractometers and enhancing their value by adding a new dimension to their operation. The detector output signal provides valuable information for collection of desired sample components.

A preferred embodiment of the present invention can be quickly attached to a vapor fractometer with comparative ease and facility and is one of the features which has contributed to its commercial acceptance as a vapor fractometer accessory. As will be noted in Figs. 1 and 5, the preparative column of the present invention is equipped with appropriate size fittings to adapt it to the detector blocks of conventional vapor fractometers, which ordinarily are designed to accept analysis columns of ¼" tubing. The size of the preparative column enables it to be easily accommodated within the thermostatted chamber of commercially available vapor fractometers.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

I claim:

1. A vapor fractometer column comprising at least two pairs of tubes of equal length, said tubes being packed with an inert material supporting a film of liquid substrate developer, a first end cap adapted to fit the open first corresponding ends of said tubes, said end cap having an inlet connection to the first end of a first of said tubes, an outlet connection to the first end of an adjacent second tube and a conduit interconnecting the first ends of each of the other pairs of adjacent tubes, a second end cap adapted to fit the open corresponding second ends of said tubes and having conduit means interconnecting the second ends of the adjacent tubes in pairs, said second end cap being rotatable to a first and second position, said first position interconnecting the second ends of the first and second tubes and said second position interconnecting the second ends of adjacent tubes in pairs whereby the effective serial column length may be selectively changed by rotating the second end cap.

2. The apparatus of claim 1 wherein said first and second end caps are symmetrically positioned to secure said tubes in symmetrically spaced distribution about a central axis.

3. The apparatus of claim 2 wherein said tubes are circularly arranged about said central axis.

References Cited in the file of this patent

UNITED STATES PATENTS

| | | |
|---|---|---|
| 2,759,560 | Miller | Aug. 21, 1952 |
| 2,841,005 | Coggeshall | July 1, 1958 |

OTHER REFERENCES

Article: Quantative Analysis of Mixture, by Green, published in Vapor Phase Chromatography (book), by Desty, Butterworths, London 1956. (Copy in Div. 36.)